(12) United States Patent
Sugisaki et al.

(10) Patent No.: US 9,787,244 B2
(45) Date of Patent: Oct. 10, 2017

(54) AIR CONDITIONER

(71) Applicant: Mitsubishi Electric Corporation, Tokyo (JP)

(72) Inventors: Norihiko Sugisaki, Tokyo (JP); Norikazu Ito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/505,768

(22) Filed: Oct. 3, 2014

(65) Prior Publication Data

US 2015/0194912 A1 Jul. 9, 2015

(30) Foreign Application Priority Data

Jan. 7, 2014 (JP) .................. 2014-001026

(51) Int. Cl.
*H02H 3/08* (2006.01)
*H02H 7/08* (2006.01)
*H02P 29/02* (2016.01)
*F25B 49/02* (2006.01)
*F25B 49/00* (2006.01)

(52) U.S. Cl.
CPC ............ *H02P 29/02* (2013.01); *F25B 49/025* (2013.01); *F25B 49/005* (2013.01); *F25B 2500/06* (2013.01); *F25B 2600/021* (2013.01); *F25B 2700/151* (2013.01); *Y02B 30/741* (2013.01)

(58) Field of Classification Search
CPC ............ H02P 6/182; H02P 6/16; H02P 27/06
See application file for complete search history.

(56) References Cited

U.S. PATENT DOCUMENTS

| 5,371,645 A | 12/1994 | Mochizuki |
| 6,364,619 B1 * | 4/2002 | Williams ............... F04C 28/28 323/907 |
| 8,154,237 B2 | 4/2012 | Higashikata |

(Continued)

FOREIGN PATENT DOCUMENTS

| EP | 0539163 A2 | 4/1993 |
| EP | 0546981 A2 * | 6/1993 ........... H02H 7/0833 |

(Continued)

OTHER PUBLICATIONS

Extended European Search Report issued on Jun. 5, 2015 in the corresponding EP application No. 14187798.5.

(Continued)

*Primary Examiner* — Eduardo Colon Santana
*Assistant Examiner* — Charles S Laughlin
(74) *Attorney, Agent, or Firm* — Posz Law Group, PLC

(57) ABSTRACT

An air conditioner includes an inverter circuit, a control unit that controls the inverter circuit, a compressor having a protection device (a pressure switch), and a phase-voltage detection circuit (a U-phase voltage detection circuit) that detects a voltage at any of three-phase windings (compressor windings) of the compressor. The control unit includes a shutdown-cause specifying unit that determines presence or absence of an operation of the protection device based on a phase voltage value detected by the phase-voltage detection circuit, by turning on any of a plurality of switching elements constituting the inverter circuit, after the compressor has been shut down, and specifies a cause of the shutdown of the compressor.

7 Claims, 5 Drawing Sheets

(56) References Cited

U.S. PATENT DOCUMENTS

| | | | | |
|---|---|---|---|---|
| 8,234,879 B2* | 8/2012 | Hwang | ................ | F24F 11/0079 |
| | | | | 417/42 |
| 8,587,241 B2* | 11/2013 | Maeda | .................... | H02P 6/002 |
| | | | | 318/376 |
| 2003/0010487 A1 | 1/2003 | Ieda et al. | | |
| 2010/0207563 A1* | 8/2010 | Higashikata | ............ | F04B 35/04 |
| | | | | 318/473 |
| 2011/0035114 A1* | 2/2011 | Yoneda | .................. | B62D 5/046 |
| | | | | 701/42 |

FOREIGN PATENT DOCUMENTS

| | | | |
|---|---|---|---|
| JP | 05-272465 A | 10/1993 | |
| JP | 11-075386 A | 3/1999 | |
| JP | 2001-278087 A | 10/2001 | |
| JP | 2007-318824 A | 12/2007 | |
| JP | 2009-036056 A | 2/2009 | |
| JP | 5005449 B2 | 6/2012 | |
| JP | 5031547 B2 | 7/2012 | |

OTHER PUBLICATIONS

Office Action mailed Aug. 4, 2015 in the corresponding AU application No. 2014240321.
Office Action dated Jan. 4, 2017 issued in corresponding CN patent application No. 201410645581.4 (and English translation).

* cited by examiner

AIR CONDITIONER

BACKGROUND OF THE INVENTION

1. Field of the Invention

The present invention relates to an air conditioner.

2. Description of the Related Art

A compressor drive device incorporated in a conventional air conditioner is configured to block power distribution to a motor by opening a contact point (a thermostat) serially connected to a motor winding at the time of increase of pressure or temperature inside a compressor, thereby preventing abnormal increase of pressure or temperature in the compressor. In the compressor drive device, when the winding temperature of the motor has reached a predetermined temperature to be protected, a phase current of a phase in which the contact point is provided is blocked by opening the contact point, and a current sensor detects that a phase current value of the phase in which the contact point is provided is zero, and all the three-phase current outputs are stopped based on an output of the current sensor (see, for example, Japanese Patent Application Laid-open No. 2007-318824).

However, in the conventional technique represented by the above patent document, power distribution to the motor is blocked at the time of increase of pressure or temperature inside the compressor, which prevents abnormal increase of the pressure or temperature in the compressor. However, it cannot be specified whether the cause of shutdown of the compressor is due to abnormal pressure or other than the abnormal pressure (for example, overcurrent, abnormal bus voltage, or open-phase abnormality).

SUMMARY OF THE INVENTION

It is an object of the present invention to at least partially solve the problems in the conventional technology.

According to an aspect of the present invention, an air conditioner including: an inverter circuit that has a plurality of switching elements to be on-off controlled, and converts a DC voltage to an AC voltage of an arbitrary frequency to drive an AC electric motor; a control unit that executes on-off control with respect to each switching element to control the inverter circuit; a compressor having a protection device that opens an electric connection of three-phase windings therein connected to the inverter circuit at a time of occurrence of an abnormality in the compressor driven by the inverter circuit; and a phase-voltage detection circuit that detects a voltage at any of the three-phase windings in the compressor. The control unit includes a shutdown-cause specifying unit that determines presence or absence of an operation of the protection device based on a phase voltage value detected by the phase-voltage detection circuit through an operation of any of the switching elements after the compressor has been shut down, and specifies a cause of the shutdown of the compressor.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an air conditioner according to the present invention will be explained below in detail with reference to the accompanying drawings. The present invention is not limited to the embodiments.

Embodiment

Figure 1:
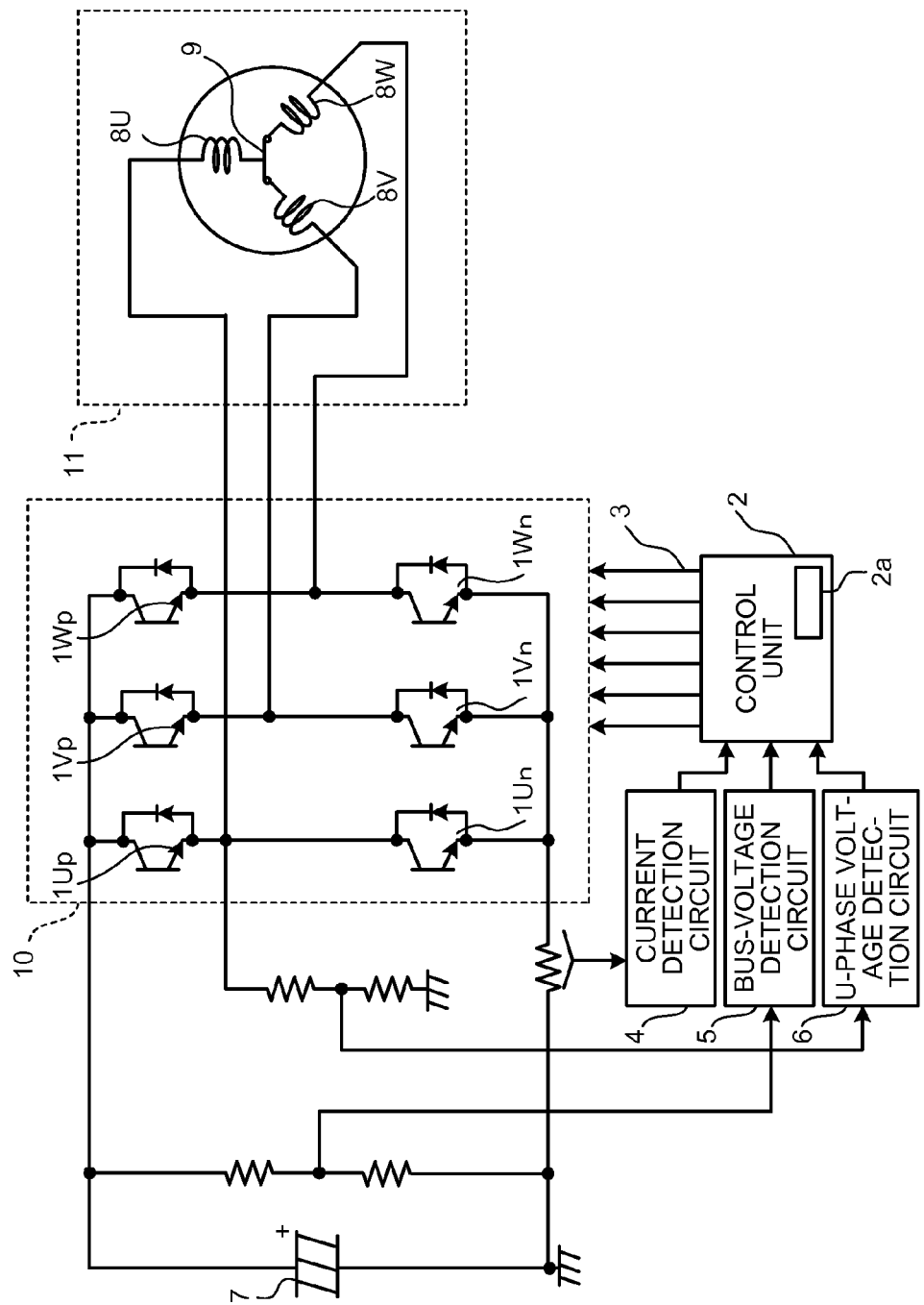
FIG. 1 is a system block diagram of an inverter device and a compressor incorporated in an air conditioner according to an embodiment of the present invention.
Figure 2:
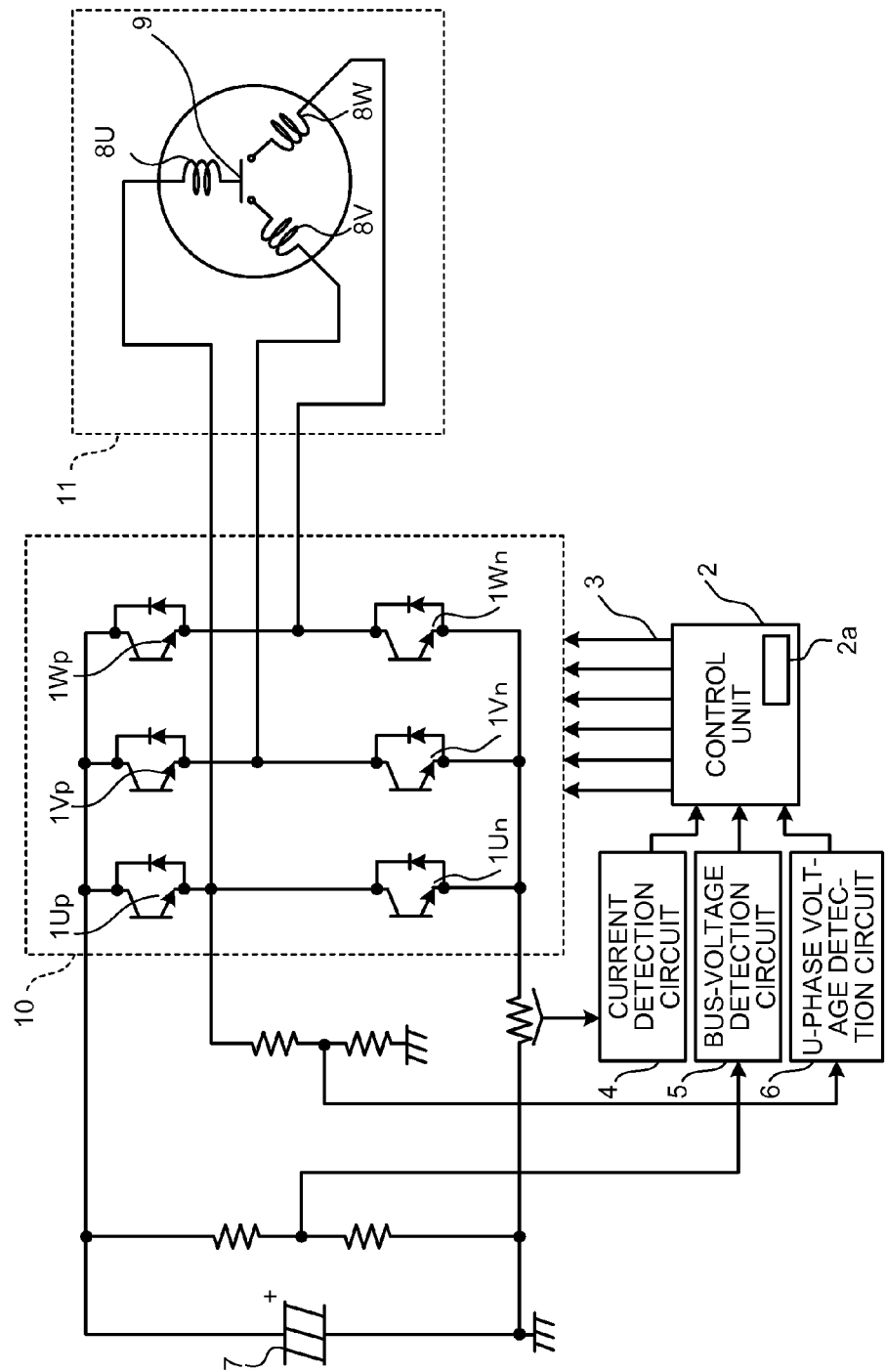
FIG. 2 is a system block diagram of the inverter device and the compressor at the time of operating a pressure switch.
Figure 3:
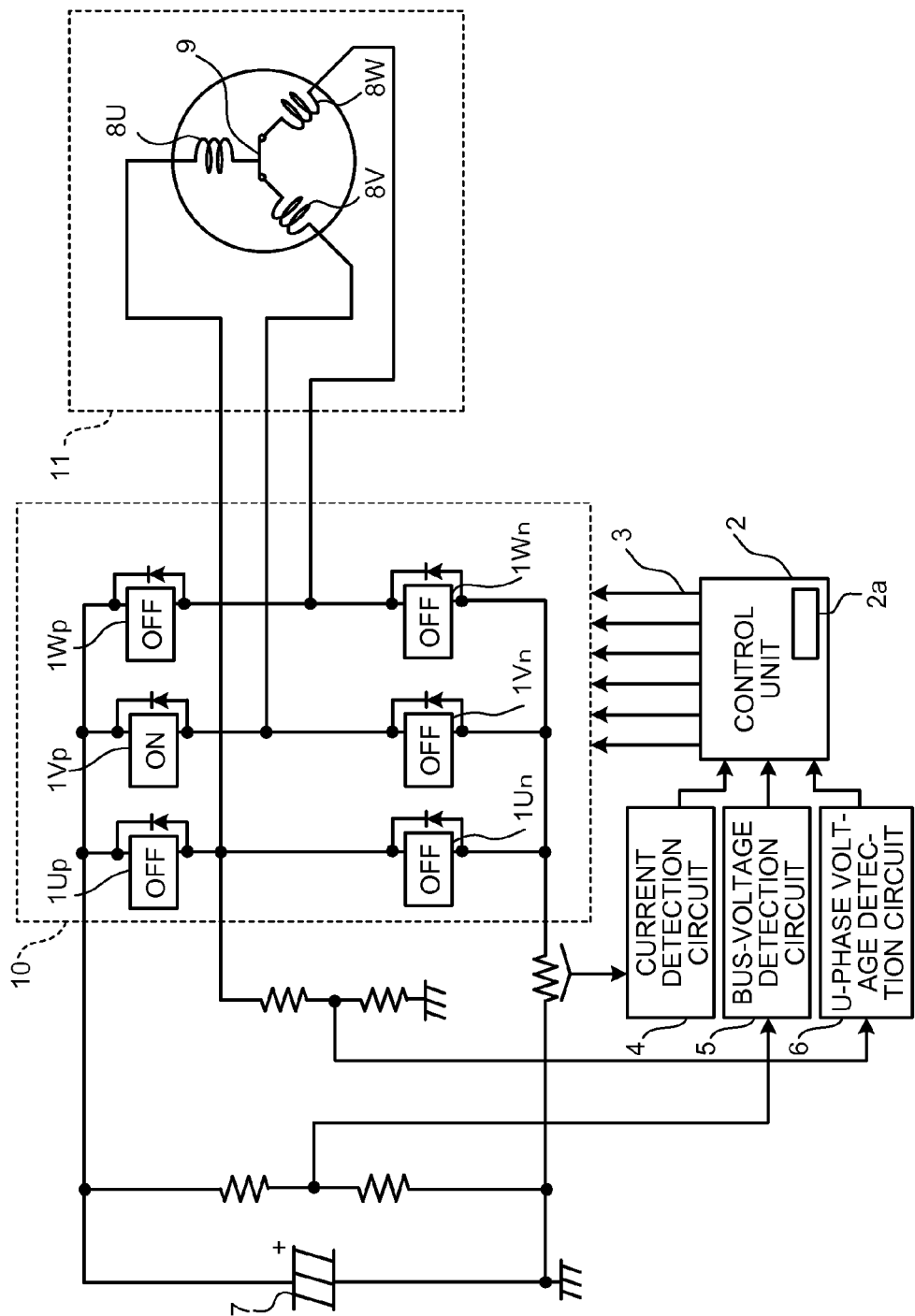
FIG. 3 is a first explanatory diagram of an operation for confirming whether the pressure switch has been operated.
Figure 4:
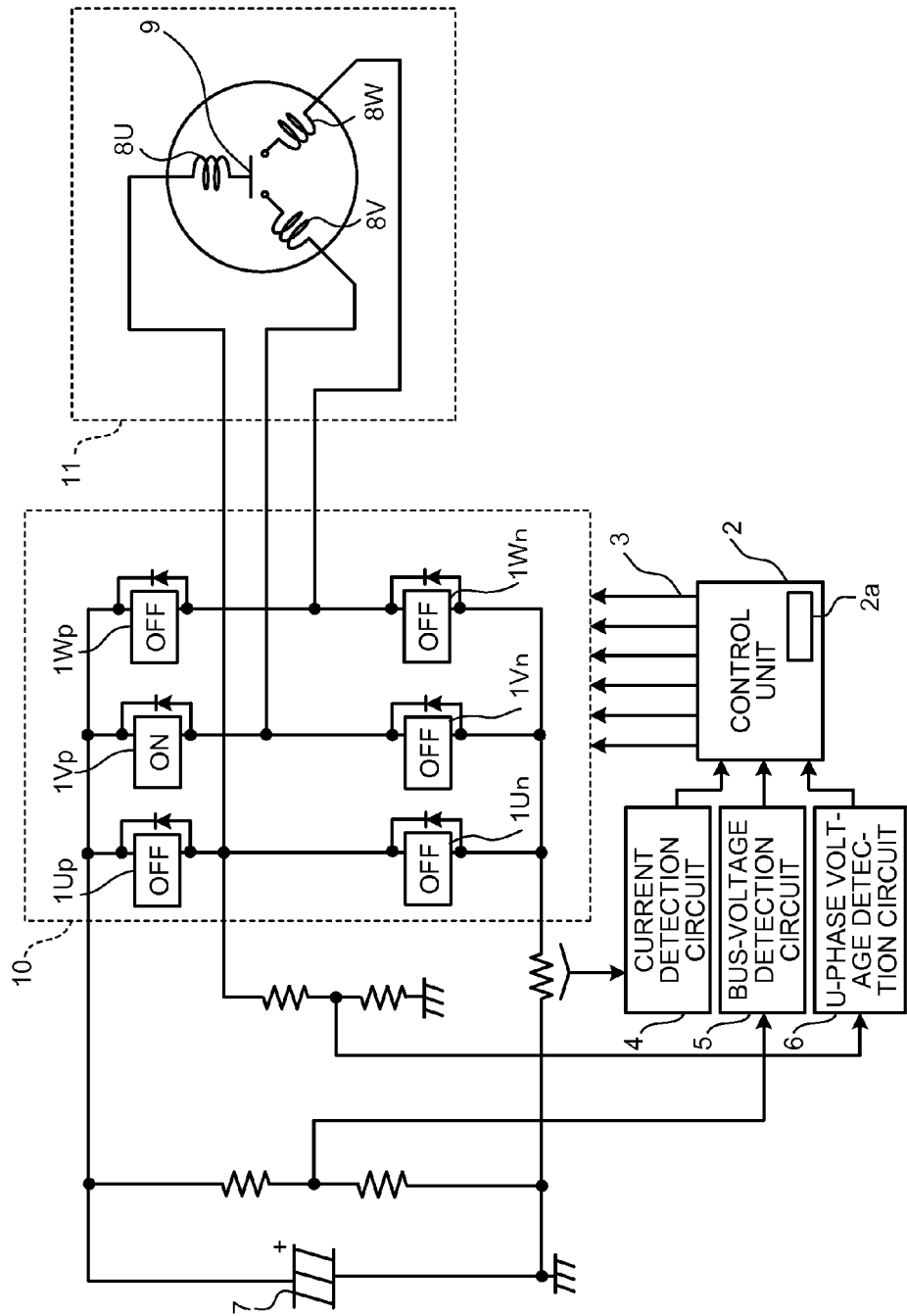
FIG. 4 is a second explanatory diagram of an operation for confirming whether the pressure switch has been operated.
Figure 5:
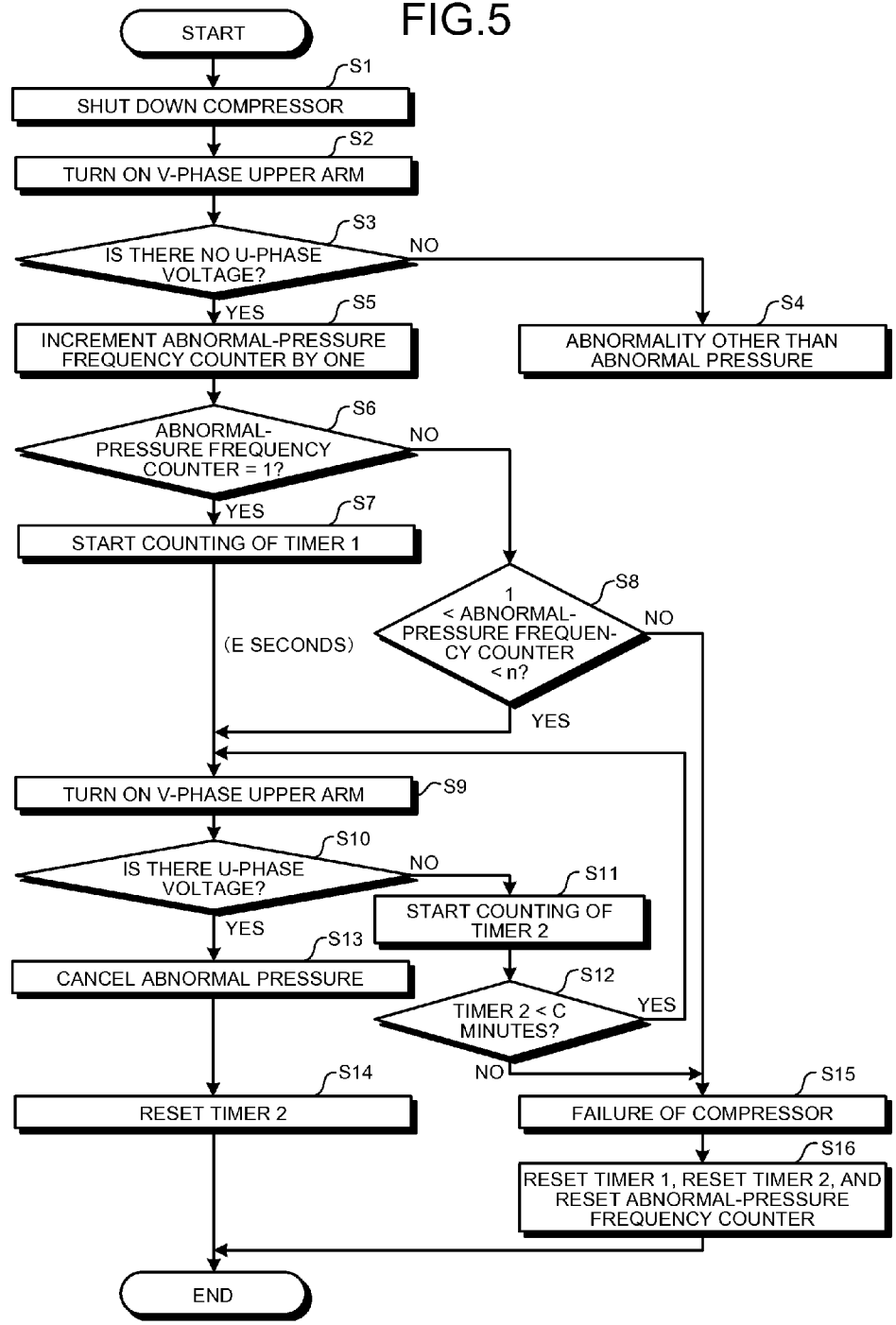
FIG. 5 is a flowchart showing an operation when an abnormality has occurred in a compressor.

FIG. 1 is a system block diagram of an inverter device and a compressor 11 incorporated in an air conditioner according to an embodiment of the present invention. FIG. 2 is a system block diagram of the inverter device and the compressor 11 at the time of operating a pressure switch 9. FIG. 3 is a first explanatory diagram of an operation for confirming whether the pressure switch 9 has been operated. FIG. 4 is a second explanatory diagram of an operation for confirming whether the pressure switch 9 has been operated. FIG. 5 is a flowchart showing an operation when an abnormality has occurred in a compressor.

The inverter device shown in FIG. 1 includes an inverter circuit 10, a control unit 2, a current detection circuit 4, a bus-voltage detection circuit 5, and a U-phase voltage detection circuit 6 as a main configuration. In FIG. 1, upper-arm switching elements constituting the inverter circuit 10 are defined as "1Up", "1Vp", and "1Wp", and lower arm switching elements are defined as "1Un", "1Vn", and "1Wn". In FIG. 1, compressor windings 8U, 8V, and 8W (winding of the motor) and the pressure switch 9 (a protection device), which are a part of constituent elements of the compressor 11 driven by the inverter device, are shown.

The current detection circuit 4 detects a DC current value flowing into the inverter circuit 10, and the DC current value detected by the current detection circuit 4 is input to the control unit 2 and used for blocking overcurrent of the switching elements 1Up to 1Wn or the like.

The bus-voltage detection circuit 5 detects a voltage between both ends (a divided voltage) of a capacitor 7 to be applied to the inverter circuit 10, and the voltage detected by the bus-voltage detection circuit 5 is input to the control unit 2 as a bus voltage value and used for detection of an abnormal bus voltage or the like.

The U-phase voltage detection circuit 6 is connected to the U-phase compressor winding 8U and a connection terminal between the switching elements 1Up and 1Un, and a U-phase voltage value detected by the U-phase voltage detection circuit 6 is input to the control unit 2. A shutdown-cause specifying unit 2a of the control unit 2 described later determines whether the pressure switch 9 is in an operation state or a non-operation state according to the U-phase voltage value output from the U-phase voltage detection circuit 6. In the present embodiment, the U-phase voltage value is detected by the U-phase voltage detection circuit 6 as an example. However, the state of the pressure switch 9 can be determined by using a phase voltage value of any phase of the U phase, V phase, and W phase, or the state of the pressure switch 9 can be determined by using a plurality of phase voltage values of the U phase, V phase, and W phase.

The pressure switch 9 is provided so as to open or close an electric connection among the U-phase compressor winding 8U, the V-phase compressor winding 8V, and the W-phase compressor winding 8W. For example, when the discharge-side pressure in an airtight container (not shown) of the compressor 11 is lower than a certain threshold, the pressure switch 9, as shown in FIG. 1, closes the electric connection of the compressor windings 8U to 8W. When the discharge-side pressure exceeds the certain threshold, the pressure switch 9, as shown in FIG. 2, opens the electric connection of the compressor windings 8U to 8W. Even when the discharge-side pressure having exceeded the certain threshold becomes a lower value than the threshold again, the pressure switch 9 returns to the state before the operation (a non-operation state) to close the compressor windings 8U to 8W. As the threshold, a value when determining the discharge-side pressure at the time of increase and a value when determining the discharge-side pressure at the time of decrease can be the same as or different from each other.

The control unit 2 is connected to the respective switching elements 1Up to 1Wn by a connection line 3 via a drive circuit (not shown) or the like, to control the respective switching elements 1Up to 1Wn based on the DC current value detected by the current detection circuit 4, a rotation-number command signal (not shown), or the like. The inverter circuit 10 controlled by the control unit 2 switches a DC voltage from the capacitor 7 by PWM modulation to convert the DC voltage to an AC voltage having a sinusoidal waveform, and outputs the AC voltage to the compressor windings 8U to 8W, the constituent elements of the compressor 11.

The control unit 2 also includes the shutdown-cause specifying unit 2a that specifies whether the cause of shutdown of the compressor 11 is due to abnormal pressure or other than the abnormal pressure (for example, overcurrent, bus voltage abnormality, or open phase abnormality), and determines whether the cause of abnormal pressure is due to a compressor failure or other factors (for example, temporary load fluctuation of a refrigerant circuit).

An operation for specifying the cause of shutdown of the compressor is explained below. In FIG. 5, when having determined that any of overcurrent, abnormal bus voltage, and open-phase abnormality has occurred based on a phase-current detection value, a bus voltage value, and a U-phase voltage value respectively from the current detection circuit 4, the bus-voltage detection circuit 5, and the U-phase voltage detection circuit 6, the control unit 2 stops drive of the respective switching elements 1Up to 1Wn in order to protect the compressor 11, thereby shutting down the compressor 11 (Step S1).

The shutdown-cause specifying unit 2a turns on only the upper-arm switching element 1Vp (a V-phase upper arm) for a certain time (B seconds) after a certain time (A seconds) has passed since shutdown of the compressor 11, in order to confirm whether the pressure switch 9 has been operated (Step S2). In the present embodiment, only the switching element 1Vp is turned on in order to confirm whether the pressure switch 9 has been operated, as an example. However, the switching element of another phase can be turned on or switching elements of a plurality of phases can be turned on to confirm the operation state of the pressure switch 9. In the present embodiment, the switching element 1Vp is turned on after the certain time (A seconds) has passed since shutdown of the compressor 11. However, the switching element 1Vp can be turned on immediately after an abnormality has occurred in the compressor 11 without setting the certain time (A seconds). Furthermore, the certain time (B seconds) to turn on the switching element 1Vp is set to a time capable of detecting a voltage by the U-phase voltage detection circuit 6.

The shutdown-cause specifying unit 2a that has turned on the switching element 1Vp determines whether there is the U-phase voltage based on the U-phase voltage value detected by the U-phase voltage detection circuit 6, that is, whether the pressure switch 9 is in the operation state or the non-operation state based on the presence or absence of the U-phase voltage (Step S3).

When there is the U-phase voltage at Step S3 (NO at Step S3), the shutdown-cause specifying unit 2a determines that the pressure switch 9 is not operated as shown in FIG. 3 (determines that it is not abnormal pressure), and determines that the cause of shutdown of the compressor 11 is other than the abnormal pressure (for example, overcurrent, abnormal bus voltage, or open-phase abnormality) (Step S4).

When there is no U-phase voltage at Step S3 (YES at Step S3), as shown in FIG. 4, the shutdown-cause specifying unit 2a determines that the pressure switch 9 has been operated (determines that there is abnormal pressure), and increments an abnormal-pressure frequency counter by one (Step S5). The abnormal-pressure frequency counter indicates the frequency of occurrence of abnormal pressure (that is, the frequency of occurrence of high-pressure abnormality) during a period of a certain time (C minutes), and is used for determining whether the cause of abnormal pressure is due to a compressor failure or other factors (for example, temporary load fluctuation of a refrigerant circuit).

The shutdown-cause specifying unit 2a determines whether a value of the abnormal-pressure frequency counter is equal to 1 (Step S6). When the value of the abnormal-pressure frequency counter is not equal to 1 (NO at Step S6), that is, the value of the abnormal-pressure frequency counter is equal to or larger than 2, the shutdown-cause specifying unit 2a performs an operation at Step S8. When the value of the abnormal-pressure frequency counter is equal to 1 (YES at Step S6), the shutdown-cause specifying unit 2a performs an operation at Step S7.

When the value of the abnormal-pressure frequency counter is equal to 1 at Step S6, the shutdown-cause specifying unit 2a starts counting of a timer 1 in order to obtain an elapsed time from a time point at which abnormal pressure has occurred (a time point at which the abnormal-pressure frequency counter is incremented by one) (Step S7). The timer 1 is used for determination of whether the compressor 11 has a failure by detecting the frequency of abnormal pressure (the frequency of occurrence of abnormal pressure during a specified time (C minutes)). The timer 1 is reset after passage of a certain time (D minutes) as described later.

On the other hand, when the value of the abnormal-pressure frequency counter is not equal to 1 at Step S6, the shutdown-cause specifying unit 2a determines whether the value of the abnormal-pressure frequency counter is less than a specified number of times n (Step S8). The specified number of times n is set based on the frequency of occurrence of abnormal pressure, by which it can be concluded that the compressor 11 has a failure.

When the frequency of occurrence of abnormal pressure is less than the specified number of times n (YES at Step S8), the shutdown-cause specifying unit 2a determines that the cause of abnormal pressure may be temporary load fluctuation of a refrigerant circuit and performs an operation at Step S9.

When the frequency of occurrence of abnormal pressure exceeds the specified number of times n (NO at Step S8), the shutdown-cause specifying unit 2a performs an operation at Step S15.

The shutdown-cause specifying unit 2a turns on only the upper-arm switching element 1Vp again for the certain time (B seconds) after passage of a certain time (E seconds) after counting of the timer 1 has been started at Step S7 (Step S9).

The shutdown-cause specifying unit 2a having turned on the switching element 1Vp determines whether there is the U-phase voltage based on the U-phase voltage value detected by the U-phase voltage detection circuit 6 (Step S10). When there is the U-phase voltage (YES at Step S10), the shutdown-cause specifying unit 2a performs an operation at Step S10. When there is no U-phase voltage (NO at Step S10), the shutdown-cause specifying unit 2a performs an operation at Step S11.

At Step S10, when there is no U-phase voltage (NO at Step S10), the shutdown-cause specifying unit 2a starts counting of a timer 2 to obtain a duration time of abnormal pressure (Step S11). The timer 2 is used for determining that the compressor has a failure when the pressure switch 9 does not return to the state before the operation due to the failure of the compressor 11, although the discharge-side pressure in the airtight container of the compressor 11 has dropped below the threshold after the pressure switch 9 has been operated.

The shutdown-cause specifying unit 2a determines whether the timer 2 is within the specified time (C minutes) (Step S12). The specified time (C minutes) is set to, for example, a value larger than a time interval taken from a time when the compressor 11 is shut down to a time when the discharge-side pressure in the airtight container of the compressor 11 becomes equal to or lower than the threshold. The specified time is not limited thereto.

When the timer 2 is within the specified time (C minutes) (YES at Step S12), the shutdown-cause specifying unit 2a performs the operation at Step S9. When the timer 2 exceeds the specified time (C minutes) (NO at Step S12), the shutdown-cause specifying unit 2a performs the operation at Step S15.

At Step S10, when there is the U-phase voltage (YES at Step S10), the shutdown-cause specifying unit 2a determines that the pressure switch 9 has returned to the state before the operation (a non-operation state) and the compressor windings 8U to 8W are closed, because the discharge-side pressure in the airtight container of the compressor 11 becomes lower than the certain threshold, thereby canceling the abnormal pressure (Step S13). The control unit 2 restarts the compressor 11 by driving the inverter circuit 10 after the certain time has passed since canceling of the abnormal pressure.

After canceling abnormal pressure, the control unit 2 resets counting of the timer 2 (Step S14).

At Step S8, when the frequency of occurrence of abnormal pressure exceeds the specified number of times n (NO at Step S8), the shutdown-cause specifying unit 2a determines that the cause of abnormal pressure is not due to temporary load fluctuation of a refrigerant circuit, but is due to a failure of the compressor 11 (Step S15), and transmits an error signal to outside. At Step S12, when the timer 2 exceeds the specified time (C minutes) (NO at Step S12), because the pressure switch 9 has not been returned to the state before the operation, the shutdown-cause specifying unit 2a determines that the cause of abnormal pressure is due to a failure of the compressor 11 (Step S15), and transmits the error signal to outside.

After the failure of the compressor has been confirmed at Step S15, the shutdown-cause specifying unit 2a resets counting of the timer 1, timer 2, and the abnormal-pressure frequency counter (Step S16).

After counting of the timer 1 has been started at Step S7, the shutdown-cause specifying unit 2a monitors whether the value of the timer 1 has exceeded a specified time (D minutes) regardless of an operation state of the compressor 11, and when the timer 1 has exceeded the specified time (D minutes), resets the timer 1 and the abnormal-pressure frequency counter.

As explained above, the air conditioner according to the present embodiment includes the inverter circuit 10 that has the plurality of switching elements 1Up to 1Wn to be on-off controlled and converts the DC voltage to the AC voltage of an arbitrary frequency to drive an AC electric motor, and the control unit 2 that executes on-off control with respect to the switching elements 1Up to 1Wn to control the inverter circuit 10. The air conditioner also includes the compressor 11 having a protection device (the pressure switch 9) that opens the electric connection of the three-phase windings (the compressor windings 8U to 8W) in the compressor 11 connected to the inverter circuit 10 at the time of occurrence of an abnormality in the compressor 11 driven by the inverter circuit 10, and a phase-voltage detection circuit (the U-phase voltage detection circuit 6) that detects any voltage of the three-phase windings in the compressor 11. The control unit 2 includes the shutdown-cause specifying unit 2a that determines the presence or absence of the operation of the protection device based on the phase voltage value detected by the phase-voltage detection circuit by turning on any of the switching elements 1Up to 1Wn after the compressor 11 has been shut down, thereby specifying the cause as to why the compressor 11 has been shut down. According to the configuration, it can be determined whether the protection device has been operated, and whether the cause of shutdown of the compressor 11 is due to abnormal pressure or other than the abnormal pressure (for example, overcurrent, abnormal bus voltage, or open-phase abnormality) can be specified.

The shutdown-cause specifying unit 2a is configured to detect restoration of the operated protection device based on the phase voltage value detected by the phase-voltage detection circuit. Accordingly, it can be determined that the cause of abnormal pressure is due to temporary load fluctuation of a refrigerant circuit or the like, and the compressor 11 can be restarted by canceling the abnormal pressure.

The shutdown-cause specifying unit 2a is configured to detect an operation frequency of the protection device based on the phase voltage value detected by the phase-voltage detection circuit, thereby determining the presence or absence of a failure of the compressor 11. Accordingly, it can be reliably determined that the cause of abnormal pressure is due to a failure of the compressor or other factors (for example, temporary load fluctuation of a refrigerant circuit).

The embodiment of the present invention is only an example of the contents of the present invention, and it is possible to combine the embodiment with other publicly-known techniques, and it is needless to mention that the present invention can be configured while modifying it without departing from the scope of the invention, such as omitting a part of configurations in the embodiment.

According to the present invention, the cause of shutdown of a compressor can be specified by determining the presence or absence of operation of a protection device based on a phase voltage value detected by a phase-voltage detection circuit.

The control unit includes a shutdown-cause specifying unit that determines presence or absence of an operation of the protection device based on a phase voltage value detected by the phase-voltage detection circuit through an operation of any of the switching elements after the compressor has been shut down, and specifies a cause of the shutdown of the compressor.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An air conditioner comprising:
   an inverter circuit that has a plurality of switching elements configured to be on-off controlled, and that converts a DC voltage to an AC voltage of an arbitrary frequency to drive an AC electric motor;
   a control unit that executes on-off control with respect to each of the plurality of switching elements to control the inverter circuit;
   a compressor having a pressure switch that simultaneously opens electric connections of three-phase windings contained within the compressor and connected to the inverter circuit at a time of occurrence of an abnormality in the compressor driven by the inverter circuit; and
   a phase-voltage detection circuit that detects a voltage at any of the three-phase windings in the compressor, wherein
   the control unit includes a shutdown-cause specifying unit that determines presence or absence of an operation of the pressure switch based on a phase voltage value detected by the phase-voltage detection circuit through an operation of any of the switching elements after the compressor has been shut down, and specifies a cause of the shutdown of the compressor.

2. The air conditioner according to claim 1, wherein the shutdown-cause specifying unit detects restoration of the operated pressure switch based on the phase voltage value detected by the phase-voltage detection circuit.

3. The air conditioner according to claim 1, wherein the shutdown-cause specifying unit detects an operation frequency of the pressure switch based on the phase voltage value detected by the phase-voltage detection circuit, and determines presence or absence of a failure of the compressor.

4. The air conditioner according to claim 1, wherein the pressure switch is electrically connected between the three-phase windings of the compressor.

5. The air conditioner according to claim 1, wherein the shutdown-cause specifying unit is configured to determine the operation of the pressure switch and increment an abnormal-pressure frequency counter in response to the operation of the pressure switch.

6. The air conditioner according to claim 1, wherein a time of occurrence of an abnormality in the compressor driven by the inverter circuit is where a discharge-side pressure in an airtight container of the compressor driven by the inverter circuit exceeds a predetermined threshold.

7. An air conditioner comprising:
   an inverter circuit that has a plurality of switching elements configured to be on-off controlled, and that converts a DC voltage to an AC voltage of an arbitrary frequency to drive an AC electric motor;
   a control unit that executes on-off control with respect to each of the plurality of switching elements to control the inverter circuit;
   a compressor having a pressure switch that simultaneously opens electric connections of three-phase windings contained within the compressor and connected to the inverter circuit at a time of occurrence of an abnormality in the compressor driven by the inverter circuit; and
   a phase-voltage detection circuit that detects a voltage at any of the three-phase windings in the compressor, wherein
   the control unit includes a shutdown-cause specifying unit that:
   determines presence or absence of an operation of the pressure switch based on a phase voltage value detected by the phase-voltage detection circuit through an operation of any of the switching elements after the compressor has been shut down;
   counts each occurrence of the presence of an operation of the pressure switch over a period of time and determines a frequency of the presence of an operation of the pressure switch;
   determines a duration of time for each occurrence of the presence of an operation of the pressure switch; and
   based thereon, specifies a cause of the shutdown of the compressor.

* * * * *